(12) United States Patent
Krymsky

(10) Patent No.: US 6,200,361 B1
(45) Date of Patent: Mar. 13, 2001

(54) MULTI-STAGE CYCLONE SYSTEM FOR CLEANING AIR

(76) Inventor: Mark D. Krymsky, 412 Whittier Dr., Langhorne, PA (US) 19053

( * ) Notice: Subject to any disclaimer, the term of this patent is extended or adjusted under 35 U.S.C. 154(b) by 0 days.

(21) Appl. No.: 09/294,170

(22) Filed: Apr. 19, 1999

(51) Int. Cl.[7] ............................. B01D 45/14; B01D 50/00
(52) U.S. Cl. ................................. 55/319; 55/404; 55/409; 55/437
(58) Field of Search ........................... 55/318, 319, 403, 55/404, 405, 408, 409, 437

(56) References Cited

U.S. PATENT DOCUMENTS 3,440,800 * 4/1969 Messin-Jaschin ..................... 55/404
3,447,290 * 6/1969 Flory ..................................... 55/404

* cited by examiner

Primary Examiner—David A. Simmons
Assistant Examiner—Robert A. Hopkins

(74) Attorney, Agent, or Firm—Norman E. Lehrer

(57) ABSTRACT

A filtering system which essentially includes a generally cylindrical chamber with an inlet nozzle, having openings, located near the bottom of the chamber which extends into the chamber, an activator, a turbine with an axle, both the activator and turbine being located along the axle of the turbine, and an outlet nozzle located near the top of the chamber is disclosed. Air mixed with contaminants enters the chamber through the inlet nozzle via the openings and heads toward the outlet nozzle. Heavier particles fall to the bottom of the chamber. The air rotates the turbine which rotates the activator. As a result of this action, contaminants gather at the sides of the chamber and drop to the bottom of the chamber. A final separation between the contaminants and the air takes place as the air passes through the turbine where a non-penetrable air lock is created at the gap between the turbine and the lower edge of the outlet nozzle, further trapping particles. With the present invention, air filled with contaminants may be cleaned with or without the aid of a liquid. Also, the activator may be in the form of a cylinder or an inverted cup. The activator may also be hollow and have perforations. Furthermore, the invention may include more than one turbine and have dielectric brushes.

19 Claims, 5 Drawing Sheets

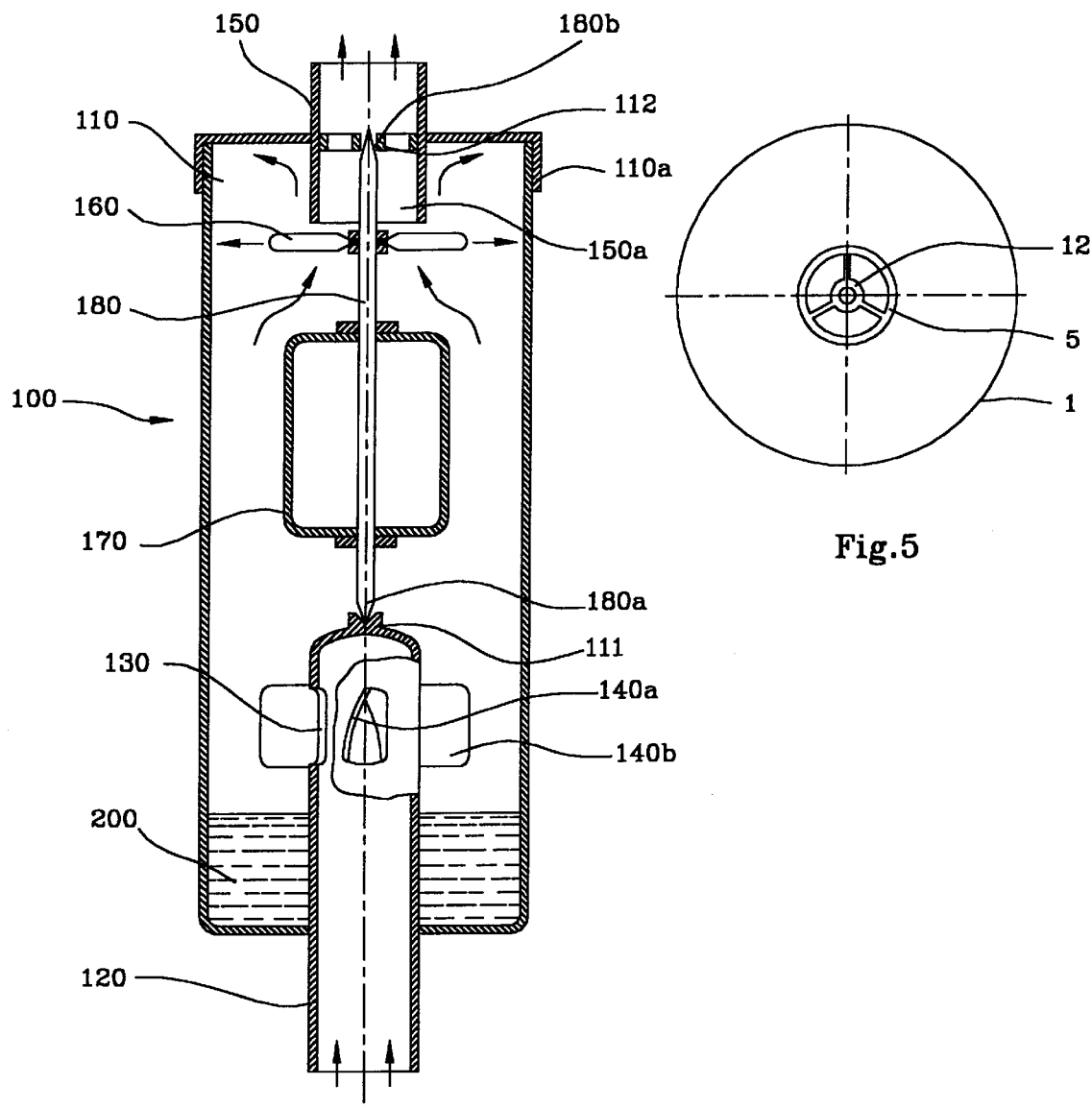

MULTI-STAGE CYCLONE SYSTEM FOR CLEANING AIR

BACKGROUND OF THE INVENTION

The present invention is directed toward a filtering system and more particularly, toward a multi-stage cyclone filtering system for dry and wet air cleaning.

Cyclone systems for separating contaminants from the air are well known and widely used in various industries and household vacuum cleaning machines. They are described in technical literature and many patents, for example: Vinit Mody et al., Dust Control Handbook, p.65; Christie J. Geankoplis, *Transport Processes and Unit Operation*, pp. 838–840; U.S. Pat. No. 3,898,068; U.S. Pat. No. 5,228,890; and U.S. Pat. No. 5,236,479.

Typically, a cyclone system includes a cylindrical chamber usually mounted vertically or inclined. The chamber has a lid through which an exhaust nozzle for the exit of clean air extends. The nozzle is mounted in a coaxial fashion to the chamber. The cyclone separation of hard contaminants from the air occurs because of the differing densities of the contaminants and the air and the rotation of air flux. That is, heavy particles collect near the walls of the chamber and flow down to the bottom by gravity. The clean air collects in the center and is released from the chamber through the exhaust nozzle. Separated dust is periodically removed from the cyclone. The conical bottom of the cyclone is often connected, by a pipe, to a special box for collecting separated contaminants. The rotation of air flux in the cyclone takes place due to the tangential placement of the air feeding nozzle.

The above-described cyclone device, however, has an insuperable contradiction. On the one hand, increasing the speed of rotation of the air flux increases the centrifugal force acting on the air and contaminants which, in turn, improves the quality of separation of the contaminants from the air. On the other hand, the increase of the air flux speed increases the carryability of air, that is, the ability of the air to entrain and move the contaminant particles, which also decreases the quality of separation. See, for example, U.S. Pat. No. 3,898,068 to McNeil. This is why the cyclone cannot remove stream particles smaller than 5 $\mu$m from the air. (Robert Noyes, *Unit Operation in Environmental Engineering*, p.321)

In order to increase the quality of separation, the contaminated air flux has to be rotated in the cyclone slowly but for a long time. Because air has a very low density and its inertia is very low, however, it quickly loses its initial direction of moving (rotation) after entering the cyclone. Its further movement is determined by the shortest way to the outlet. Because it becomes a straight line, the separation in this part of the air flux path stops. To increase the inertia of the air flux and the time of separation, the entering velocity is increased. For this reason, the diameter of the entering nozzle is decreased, compared to the diameter of the pipe conveying to the cyclone air flux. At the same time, however, as was mentioned above, the carry ability of the air increases and the quality of separation decreases.

There is also a method of improving the cleaning of air in the cyclone through the moistening of the contaminated air flow. See, Vinit Mody et al., Dust Control Handbook, p.81. According to this method, the dirt particles become heavy with moisture and attempt to collect into larger drops, which in turn, reduces the amount of centrifugal separation of dust from air. However, this phenomenon causes a new problem. The air must be then filtered out of the dispersed liquid. This is an especially difficult problem for household vacuum cleaners that use water to moisten the air flow. In such devices, two contradicting processes must take place in a compact space: the moistening of the contaminated air and the separation of air from the then contaminated water. In order for the two processes to be successful, they must be separate in time and in setting. If this requirement isn't met, it is impossible to separate the air from the water once they have mixed.

In a cyclone system with a tangent inlet nozzle, a liquid may also be used to improve the quality of cleaning. Surfactants may be added to the liquid in order to further improve the quality of cleaning. Therefore, the quality of wetting the dust particles may improve, however, this improvement is not due to the high speed of the air flow directed toward the liquid where the high speed of the flow is necessary for the centrifugal separation, but because of the addition of surfactants. And while this may be an effective method of cleaning, the dispersion of water by air flow moving at a high speed makes its later separation more difficult. Also, in introducing the air flow under the liquid contained in the chamber, the aerodynamic resistance enlarges. Furthermore, the filter becomes less reliable because when the chamber is tilted, water can leak into the inlet nozzle. See, for example, U.S. Pat. No. 3,234,713 to Harper et al.

In most known scrubber household vacuum cleaners, the separation of air from water takes place due to the air-water mixture's contact with various hard surfaces such as, the inner walls of the filter, various baffles, etc. See, for example, U.S. Pat. Nos. 1,363,859; 2,306,212; 4,251,241; 4,547,206; 4,874,404; 5,199,963; 5,354,347; and 5,776,215. In this system, as the water wets the surfaces, it remains on the surfaces. This mechanism of separation is ineffective because the contact of the entire air flow with a hard surface cannot be guaranteed. Also, there is no separation of the flow of the contaminated water from the flow of the clean air. Thus, a repeated fusion of the air and water may occur. This is also the direct cause of the ineffective separation of air from water in the turbine in U.S. Pat. No. 3,234,713 to Harper et al. The turbine separated water gathers on the wall of the outlet nozzle and is again caught by the air flow moving along the wall.

SUMMARY OF THE INVENTION

The present invention is designed to overcome the deficiencies of the prior art discussed above. It is an object of the present invention to provide a multi-stage cyclone filtering system for cleaning air with or without the use of a liquid.

It is a further object of the present invention to provide a more efficient cyclone system which uses three methods of cleaning or separation of contaminants from air, namely, settling, centrifuge, and turbine.

In accordance with the illustrative embodiments demonstrating features and advantages of the present invention, there is provided a filtering system which essentially includes a generally cylindrical chamber with an inlet nozzle, having openings, located near the bottom of the chamber which extends into the chamber, an activator, a turbine having an axle, both the activator and turbine being located along the axle of the turbine, and an outlet nozzle located near the top of the chamber. Air mixed with contaminants enters the chamber through the inlet nozzle via the openings and heads toward the outlet nozzle. Heavier particles fall to the bottom of the chamber. The air rotates the turbine which rotates the activator. As a result of this action, contaminants gather at the sides of the chamber and drop to the bottom of the chamber. A final separation between the contaminants and the air takes place as the air passes through the turbine where a non-penetrable air lock is created at the gap between the turbine and the lower edge of the outlet nozzle, further trapping particles. With the present invention, air filled with contaminants may be cleaned with or without the aid of a liquid.

Other objects, features, and advantages of the invention will be readily apparent from the following detailed description of preferred embodiments thereof taken in conjunction with the drawings.

BRIEF DESCRIPTION OF THE DRAWINGS

For the purpose of illustration the invention, there are shown in the accompanying drawing forms which are presently preferred; it being understood that the invention is not intended to be limited to the precise arrangements and instrumentalities shown.

FIG. 4 is a second embodiment of the present invention for cleaning air using a liquid;

FIG. 5 is a cross sectional view taken along 5—5 of FIG. 1;

DETAILED DESCRIPTION OF THE PREFERRED EMBODIMENTS

Figures 1, 2, 3:
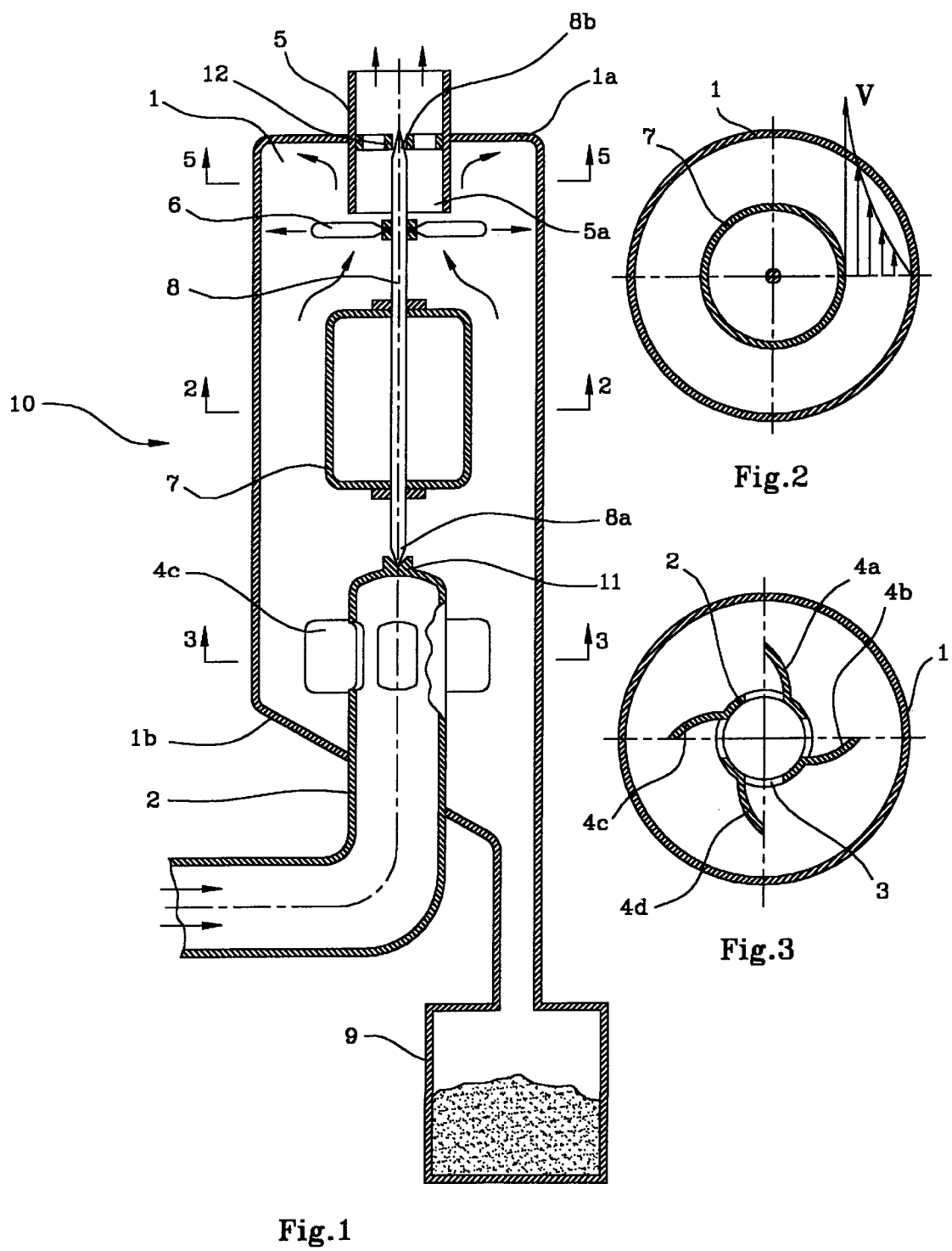
FIG. 1 is a first embodiment of the present invention for cleaning air without the use of a liquid.
FIG. 2 is a cross sectional view taken along line 2—2 of FIG. 1.
FIG. 3 is a cross sectional view taken along line 3—3 of FIG. 1.

Referring now to the drawings in detail wherein like reference numerals have been used throughout the various figures to designate like elements, there is shown in FIG. 1 a filtering system constructed in accordance with the first embodiment of the present invention and designated generally as 10.

The first embodiment of the present invention is seen in FIGS. 1–3. The device essentially includes a chamber 1 having the form of a cylinder, a truncated cone, or any other type of circular element, commonly referred to as a body of rotation. (See FIG. 1.) An inlet nozzle 2 is located in the lower part of the chamber and extends into the chamber itself. The inlet nozzle 2 has openings 3 through which contaminated air enters the chamber 1. The total area of the openings 3 is larger than the area of the cross section of the inlet nozzle 2. The openings 3 can have fins 4a–4d directing the flow tangentially to the inner surface of chamber 1 as seen in FIG. 1. The chamber 1 also has a top wall 1a.

An outlet nozzle 5 extends through the top wall 1a of the chamber 1. Outlet nozzle 5 is coaxial to the chamber 1 and extends into the chamber 1 itself. Directly in front of the opening 5a to outlet nozzle 5 and coaxial to it is the turbine 6 which has a larger diameter than that of outlet nozzle 5. The turbine 6 has an axle 8, the bottom of which forms a point 8a which freely rotates in the bearing seat 11 which is fixed to the top of inlet nozzle 2. The top of the axle 8 also forms a point 8b which freely rotates in the bearing 12 formed at the center of the outlet nozzle 5. An activator 7 is fastened on the turbine's axle 8. The activator 7 is in the form of a cylinder, as seen in FIG. 1, and is located between the inlet nozzle 2 and the outlet nozzle 5, downstream of the turbine 6 and forms an annular space between the outer wall of the activator 7 and the inner wall of the chamber 1. The inclined bottom 1b of the chamber may be connected to an accumulator chamber 9.

Since the openings 3 in the inlet nozzle 2 have larger cross sections than the inlet nozzle 2, the contaminated air entering the chamber 1 loses speed. Thus, the heavier contaminants sink to the bottom of the chamber 1 and the lower part of chamber 1 serves as a settling chamber.

Clean air, departing through the outlet nozzle 5 rotates the turbine 6, which in turn rotates the activator 7. While spinning, the activator 7 carries along the air flow, causing it to rotate in chamber 1. Thus, further centrifugal cleaning of air takes place, i.e., contaminants gather at the sides of the chamber 1 and are pulled to the bottom by gravity.

The inner part of the turbine 6 works as an actual turbine rotated by the outgoing air. But the outer part of the turbine which extends past the outlet nozzle 5, serves as a fan rotated by the inner part. This fan creates a flow of air directed upwardly along the outer surface of outlet nozzle 5. This creates a non-penetrable air lock at the inescapable gap between the turbine 6 and the lower edge of outlet nozzle where part of the air flow may wind up past the turbine.

A second embodiment of the present invention is seen in FIG. 4. The device 100 is similar in structure and function to the first embodiment. That is, the device essentially includes a chamber 110 having the form of a cylinder, a truncated cone, or any other type of circular element widening towards the bottom. (See FIG. 4.) An inlet nozzle 120 is located in the lower part of the chamber and extends into the chamber itself. The inlet nozzle 120 has openings 130 through which contaminated air enters the chamber 110. The total area of the openings 130 is larger than the area of the cross section of the inlet nozzle 120. The openings 130 can have fins 140 which direct the flow downwardly. The chamber 110 has a cover 110a.

An outlet nozzle 150 extends through the cover of the chamber 110. (See FIG. 4.) Outlet nozzle 150 is coaxial to the chamber 110 and extends into the chamber 110 itself. Directly in front of the opening 150a to outlet nozzle 150 and coaxial to it is the turbine 160 which has a larger diameter than that of outlet nozzle 150. The turbine 160 has an axle 180, the bottom of which forms a point 180a which freely rotates in the bearing seat 111 which is fixed to the top of inlet nozzle 120. The top of the axle 180 also forms a point 180b which freely rotates in the bearing 112 formed at the center of the outlet nozzle 5. An activator 170 is fastened on the turbine's axle 180 and is in the form of a cylinder. The activator 170 is located between the inlet nozzle 120 and the outlet nozzle 150, downstream of the turbine 160 and forms an annular space between the outer wall of the activator 170 and the inner wall of the chamber 110.

Since the openings 130 in the inlet nozzle 120 have larger cross sections than the inlet nozzle 120, the contaminated air entering the chamber 110 loses speed. Thus, the heavier contaminants sink to the bottom of the chamber 110 and the lower part of chamber 110 serves as a settling chamber. Unlike the first embodiment, in this embodiment a liquid 200 is poured into the bottom of the chamber 110. However, the liquid level must be such that the liquid 200 is unable to enter the outlet nozzle 150 or the inlet nozzle 120 regardless of the position of the chamber 110. Pure water or water with the addition of surfactants or deodorants can be used as the liquid. Surfactants lower the angle of liquid wetting the contaminants and various hard surfaces.

Clean air, departing through the outlet nozzle 150 rotates the turbine 160, which in turn rotates the activator 170. While spinning, the activator 170 carries along the air flow, causing it to rotate in chamber 110. Thus, further centrifugal cleaning of air takes place, i.e., contaminants gather at the sides of the chamber 110 and are pulled to the bottom by gravity. In this manner, the flow of contaminated air is directed towards the bottom of the chamber with the use of fins 140a and 140b, for example.

As in the first embodiment, the inner part of the turbine works as an actual turbine rotated by the outgoing air. But the outer part of the turbine which extends past the outlet nozzle, serves as a fan rotated by the inner part. This fan creates a flow of air directed upwardly along the outer surface of outlet nozzle. This creates a nonpenetrable air lock at the inescapable gap between the turbine and the lower edge of outlet nozzle where part of the air flow may wind up past the turbine. This is especially important when using liquid to moisten the air. Separated drops of contaminated water, due to the wetting of walls in the chamber can move along the walls in an upward direction along with the air flow, and then along the inner surface of the lid of the chamber and the outer surface of outlet nozzle to the gap between turbine and outlet nozzle because this path has a smaller aerodynamic resistance than the path through turbine.

Figure 6:
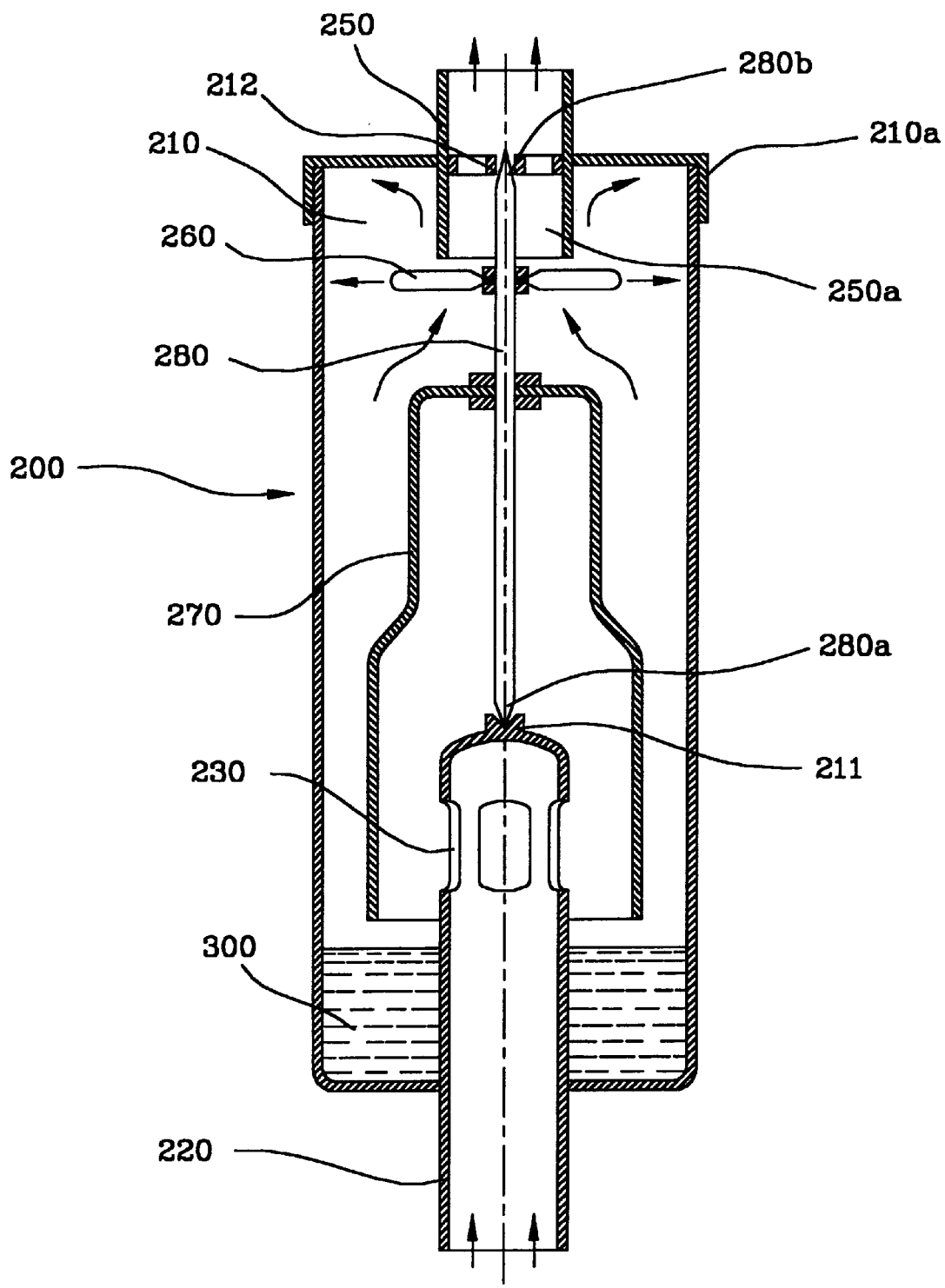
FIG. 6 is a third embodiment of the present invention for cleaning air using a liquid.

A third embodiment of the present invention is seen in FIG. 6. The device 200 in this embodiment is similar in structure to the devices described in the first and second embodiments. That is, the device essentially includes a chamber 210 having the form of a cylinder, a truncated cone, or any other type of circular element widening towards the bottom. (See FIG. 6.) An inlet nozzle 220 is located in the lower part of the chamber and extends into the chamber itself. The inlet nozzle 220 has openings 230 through which contaminated air enters the chamber 210. The total area of the openings 230 is larger than the area of the cross section of the inlet nozzle 220. In this embodiment there are no fins directing the flow of air although such fins could be utilized. The chamber 210 also has a cover 210a.

An outlet nozzle 250 extends through the cover 210a of the chamber 210. The outlet nozzle 250 is coaxial to the chamber 210 and extends into the chamber 210 itself. Directly in front of the opening 250a to outlet nozzle 250 and coaxial to it is the turbine 260 which has a larger diameter than that of outlet nozzle 250. The turbine 260 has an axle 280, the bottom of which forms a point 280a which freely rotates in the bearing seat 211 which is fixed to the top of inlet nozzle 220. The top of the axle 280 also forms a point 280b which freely rotates in the bearing 212 formed at the center of the outlet nozzle 250. An activator 270 is fastened on the turbine's axle 280 and is located between the inlet nozzle 220 and the outlet nozzle 250, downstream of the turbine 260 and forms an annular space between the outer wall of the activator 270 and the inner wall of the chamber 210. Unlike the first and second embodiments, however, the activator 270 is in the form of an inverted cup.

Since the openings 230 in the inlet nozzle 220 have larger cross sections than the inlet nozzle 220, the contaminated air entering the chamber 210 loses speed. Thus, the heavier contaminants sink to the bottom of the chamber 210 and the lower part of chamber 210 serves as a settling chamber. A liquid 300 is poured into the bottom of the chamber 210.

However, as in the second embodiment, the liquid level must be such that the liquid 300 is unable to enter the outlet nozzle 250 or the inlet nozzle 220 regardless of the position of the chamber 210. Pure water or water with the addition of surfactants or deodorants can be used as the liquid. Surfactants decrease the angle at which liquid wets the contaminants and various hard surfaces.

As in the first and second embodiments, clean air, departing through the outlet nozzle 250 rotates the turbine 260, which in turn rotates the activator 270. While spinning, the activator 270 carries along the air flow, causing it to rotate in chamber 210. Thus, further centrifugal cleaning of air takes place, i.e., contaminants gather at the sides of the chamber 210 and are pulled to the bottom by gravity.

The inner part of the turbine works as an actual turbine rotated by the outgoing air, as described in the first and second embodiments. The outer part of the turbine which extends past the outlet nozzle, serves as a fan rotated by the inner part. This fan creates a flow of air directed upwardly along the outer surface of outlet nozzle. This creates a non-penetrable air lock at the inescapable gap between the turbine and the lower edge of outlet nozzle where part of the air flow may wind up past the turbine. As in the second embodiment, this is especially important when using liquid to moisten the air. Separated drops of contaminated water, due to the wetting of walls in the chamber can move along the walls in an upward direction along with the air flow, and then along the inner surface of the lid of the chamber and the outer surface of outlet nozzle to the gap between turbine and outlet nozzle because this path has a smaller aerodynamic resistance than the path through turbine.

Figure 7:
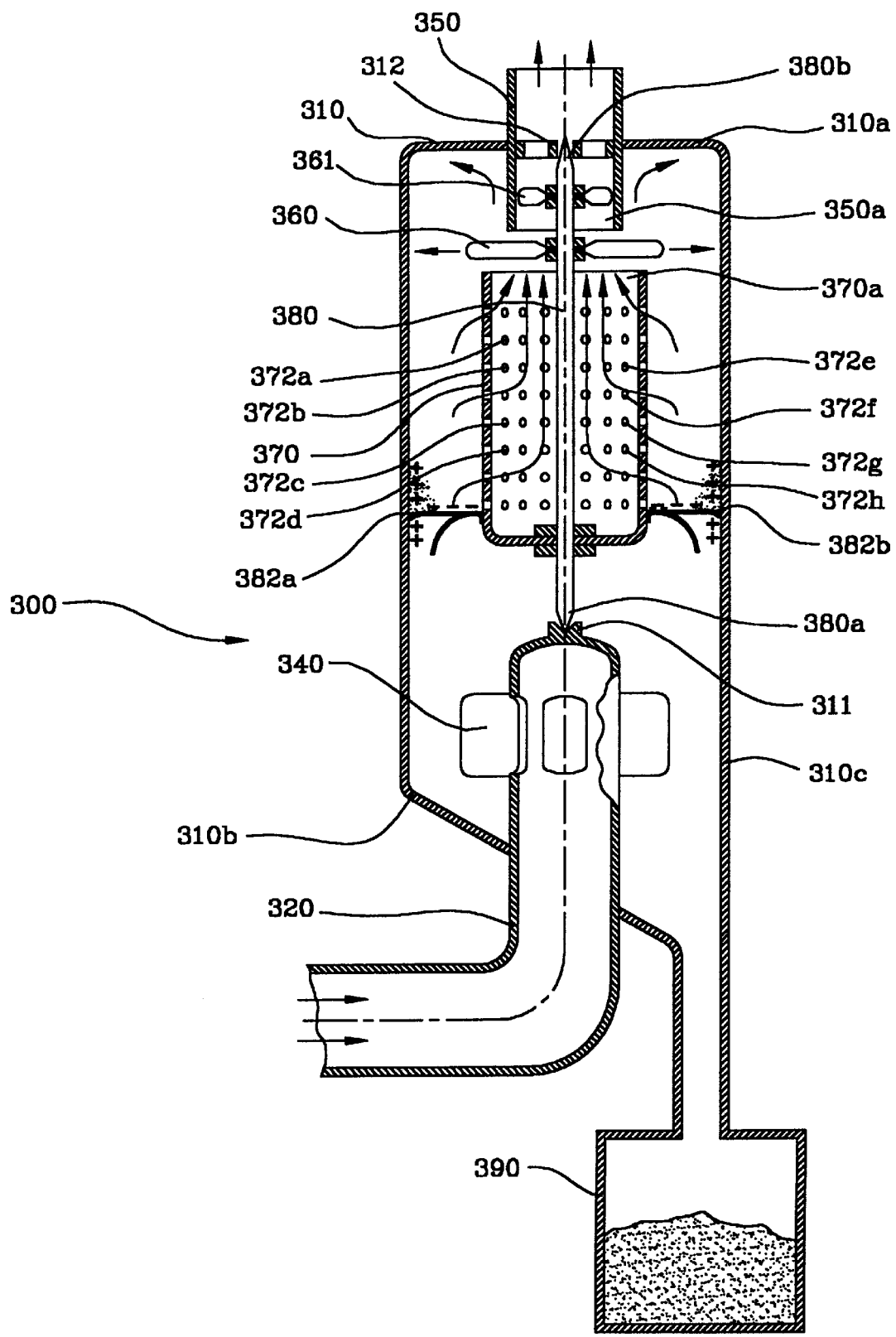
FIG. 7 is a fourth embodiment of the present invention for cleaning air without the use of a liquid.

A fourth embodiment of the present invention is seen in FIG. 7. The device 300 in this embodiment is similar in structure and function to the first embodiment. That is, the device essentially includes a chamber 310 having the form of a cylinder, a truncated cone, or any other type of circular element widening towards the bottom. An inlet nozzle 320 is located in the lower part of the chamber and extends into the chamber itself. The inlet nozzle 320 has openings through which contaminated air enters the chamber 310. The total area of the openings is larger than the area of the cross section of the inlet nozzle 320. The openings can have fins 340 directing the flow tangentially to the inner surface of chamber 310. The chamber 310 also has a top wall 310a.

An outlet nozzle 350 extends through the top wall 310a of the chamber 310. Outlet nozzle 350 is coaxial to the chamber 310 and extends into the chamber 310 itself. Directly in front of the opening 350a to outlet nozzle 350 and coaxial to it is the turbine 360 which has a larger diameter than that of outlet nozzle 350. In this embodiment, however, more than one turbine may be incorporated into the device, seen for example, as 361. The turbines 360 and 361 have an axle 380, the bottom of which forms a point 380a which freely rotates in the bearing seat 311 which is fixed to the top of inlet nozzle 320. The top of the axle 380 also forms a point 380b which freely rotates in the bearing 312 formed at the center of the outlet nozzle 350. Turbine 361 may be mounted on the axle 380 inside the outlet nozzle 350. An activator 370 is fastened on the axle 380. The activator 370 is in the form of a cylinder and is located between the inlet nozzle 320 and the outlet nozzle 350, downstream of the turbines 360 and 361, and forms an annular space between the outer wall of the activator 370 and the inner wall of the chamber 310. Unlike the previous embodiments, activator 370 may be hollow and have a plurality of perforations 372a–372h, for example. The activator 370 also has a top opening 370a. The inclined bottom 310b of the chamber may be connected to an accumulator chamber 390.

Since the openings in the inlet nozzle 320 have larger cross sections than the inlet nozzle 320, the contaminated air entering the chamber 310 loses speed. Thus, the heavier contaminants sink to the bottom of the chamber 310 and the lower part of chamber 310 serves as a settling chamber.

Clean air, departing through the outlet nozzle 350 rotates the turbines 360 and 361, which in turn rotate the activator 370. The air being cleaned must pass through the opening 370a. That is, the air must pass through the zone having the maximum rotation and where the separating force is at its maximum. A curve of the air flow is best shown in FIG. 2. Such an air path increases the quality of separation. While spinning, the activator 370 carries along the air flow, causing it to rotate in chamber 310. Thus, further centrifugal cleaning of air takes place, i.e., contaminants gather at the sides of the chamber 310 and are pulled to the bottom by gravity. The turbine 361 increases the torque by more efficiently using the kinetic energy of the departing clean air. The turbines 360 and 361 are rotated by the outgoing air.

In this embodiment, the separation of the finest dust from the air may be enhanced by the addition of flexible dielectric brushes 382a and 382b, for example, which may be attached to the activator 370 and the annular chamber 310 being made from a dielectric material. The addition of these two features prevents the redundant mixture of the dust and air. That is, during the rotation of the activator 370, brushes 382a and 382b rub against the inner surface 310c of the chamber 310, thereby charging the brushes 382a and 382b and the inner surface 310c with electrical charges of opposite sign through the effect of triboelectricity. Dielectric dust passing through the brushes 382a and 382b polarizes and is attracted to the inner surface 310c from which the dust is removed periodically. Simultaneously, brushes 382a and 382b serve as an activator which rotates the air flow in the chamber 310 and thereby increases the quality of centrifugal separation. The brushes may be used with or without the use of a liquid. In the case of cleaning air with the use of a liquid, the brushes serve as an additional and movable air penetrating obstacle for larger drops of water, throwing the drops of water against the inner surface of the chamber.

Figure 8:
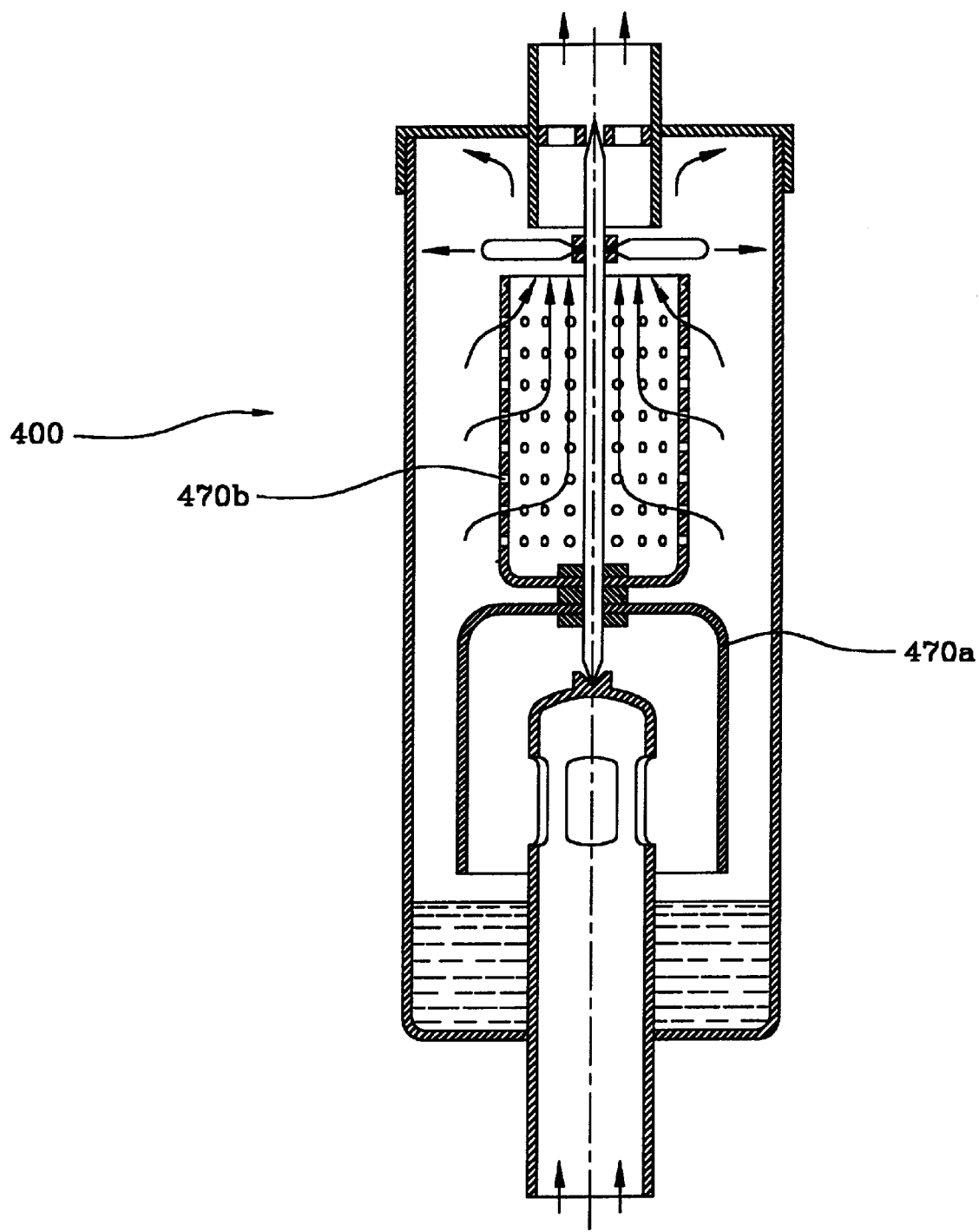
FIG. 8 is a fifth embodiment of the present invention.

A fifth embodiment of the invention is illustrated in FIG. 8. The device 400 in this embodiment is essentially a combination of the third and fourth embodiments shown in FIGS. 6 and 7. That is, this embodiment includes both an activator 470a in the form of an inverted cup similar to the activator 270 and an activator 470b in the form of an upright cup with perforations similar to activator 370. The two activators are arranged concentrically with each other and function in essentially the manner described above in connection with the third and fourth embodiments. The remain parts of this fifth embodiment are essentially the same as described above and function in essentially the same manner. Accordingly, a description of the same is not believed necessary.

In all of the embodiments discussed above, the turbine or turbines simultaneously serve several purposes. For example, the turbine rotates the activator. It also serves as a final stage of separation. That is, the finest particles of contaminants (dust) and drops of water are thrown to the side of the chamber by the blades of the turbine. This method of separation is especially effective for drops of water because the water clings to the blades. Separation by a turbine is effective due to the separation of the two flows, i.e., the contaminated air moving from the bottom upwardly towards the turbine, and the flow of drops of dirty water being thrown against the sides of the chamber, perpendicularly to the first flow. Furthermore, the inner part of the turbine works as an actual turbine rotated by the outgoing air as described above.

The rotation of the air flow due to the rotating activator has several advantages over a cyclone system with a tangent inlet nozzle. For example, the rotating activator of the present invention ensures a constant speed of rotation of the air flow during the entire process of separation. Also, the rotating activator ensures an optimum epure of speeds V in the air flow. (See FIG. 2.) That is, the maximum speed is at the surface of the rotating activator and the lowest speed is at the immobile walls of the chamber where the contaminant particles and the water drops gather. Therefore, the particles are not repeatedly picked up by the air flow which, thereby, allows the filtration of much finer particles than in a regular cyclone.

Another advantage of the rotating activator of the present invention is that because the rotation of the air flow is set by the rotation of the activator, the openings in the inlet nozzle may have an enlarged area. This causes a drop in the air flow's speed in the lower part of the chamber and causes an initial cleaning via settling.

Also, the rotation of the air flow in present invention is set by the rotation of the activator. The speed and the duration do not depend on the speed of the entering air flow, rather, they rely on the parameters of the turbine and the size of the chamber which may be made in a wide variety of sizes for reaching the best quality of separation.

A further advantage of the present invention over known filtering systems is in the placement of the turbine. That is, in the present invention, the turbine is located directly in front or downstream of the outlet nozzle which allows for a final separation of water from air as well as the complete separation of the contaminated water from the clean air. This is unlike systems where the turbine is placed within the outlet nozzle. (See, for example, U.S. Pat. No. 3,234,713 to Harper et al.) As a result, the two flows do not repeatedly mix, and the dirt is picked back up after its separation from the air.

The present invention may be embodied on other specific forms without departing from the spirit or essential attributes thereof and accordingly, reference should be made to the appended claims rather than to the foregoing specification as indicating the scope of the invention.

I claim:

1. A filtering system for cleaning air comprising:

a generally circular chamber;

inlet means for feeding contaminated air into said chamber, said inlet means extending into said chamber and having openings with a total area which is larger than the area of the cross section of said inlet means;

outlet means concentric with said chamber for allowing filtered air to exit from said chamber;

a turbine concentric with said chamber and in the vicinity of said outlet means whereby air exiting from said chamber causes said turbine to rotate; and activating means concentrically mounted to said turbine for rotation therewith, said activating means being concentric with said chamber and creating an annular space between said inlet means and said outlet means.

2. The filtering system as claimed in claim 1 wherein said chamber has a liquid and the level of said liquid is such that at any position of the said chamber liquid cannot enter said openings of said inlet means.

3. The filtering system as claimed in claim 1 wherein said outlet means has openings and said chamber has a liquid and the level of said liquid is such that at any position of the said chamber liquid cannot enter said openings of said outlet means.

4. The filtering system as claimed in claim 1 wherein said outlet means extends into said chamber.

5. The filtering system as claimed in claim 1 wherein said turbine includes an axle.

6. The filtering system as claimed in claim 5 wherein the said activating means is mounted on said axle of said turbine.

7. The filtering system as claimed in claim 1 wherein said turbine has a diameter larger than the diameter of said outlet means.

8. The filtering system as claimed in claim 1 further including more than one activating means.

9. The filtering system as claimed in claim 1 wherein said chamber is cylindrical.

10. The filtering system as claimed in claim 1 wherein said activating means is cylindrical.

11. The filtering system as claimed in claim 1 wherein said activating means is in the shape of an inverted cup.

12. The filtering system as claimed in claim 1 wherein said activating means is hollow with an open top located directly in front of said turbine, said activating means having a plurality of perforations therein.

13. The filtering system as claimed in claim 11 wherein said activating means further includes dielectric brushes which contact the inner surface of said chamber.

14. The filtering system as claimed in claim 13 wherein the inner surface of said chamber is comprised of a dielectric material.

15. The filtering system as claimed in claim 1 further including more than one turbine.

16. A filtering system for cleaning air comprising:

a generally circular chamber;

inlet means for feeding contaminated air into said chamber;

outlet means concentric with said chamber for allowing filtered air to exit from said chamber;

a turbine concentric with said chamber and in the vicinity of said outlet means whereby air exiting from said chamber causes said turbine to rotate; and a plurality of activating means concentrically mounted to said turbine for rotation therewith, each of said activating means being concentric with said chamber and creating an annular space between said inlet means and said outlet means.

17. A filtering system for cleaning air comprising:

a generally circular chamber;

inlet means for feeding contaminated air into said chamber;

outlet means concentric with said chamber for allowing filtered air to exit from said chamber;

a turbine concentric with said chamber and in the vicinity of said outlet means whereby air exiting from said chamber causes said turbine to rotate; and activating means in the form of an inverted cup concentrically mounted to said turbine for rotation therewith, said activating means being concentric with said chamber and creating an annular space between said inlet means and said outlet means.

18. A filtering system for cleaning air comprising:

a generally circular chamber;

inlet means for feeding contaminated air into said chamber;

outlet means concentric with said chamber for allowing filtered air to exit from said chamber;

a turbine concentric with said chamber and in the vicinity of said outlet means whereby air exiting from said chamber causes said turbine to rotate; and activating means concentrically mounted to said turbine for rotation therewith, said activating means having a solid closed bottom and a perforated side wall and being concentric with said chamber thereby creating an annular space between said inlet means and said outlet means, said activating means further being hollow with an open top located directly in front of said turbine.

19. A filtering system for cleaning air comprising:

a generally circular chamber;

inlet means for feeding contaminated air into said chamber;

outlet means concentric with said chamber for allowing filtered air to exit from said chamber;

a turbine concentric with said chamber and in the vicinity of said outlet means whereby air exiting from said chamber causes said turbine to rotate; and activating means concentrically mounted to said turbine for rotation therewith, said activating means being concentric with said chamber and creating an annular space between said inlet means and said outlet, said activating means including dielectric brushes which contact the inner surface of said chamber.

* * * * *